ated Apr. 18, 1967

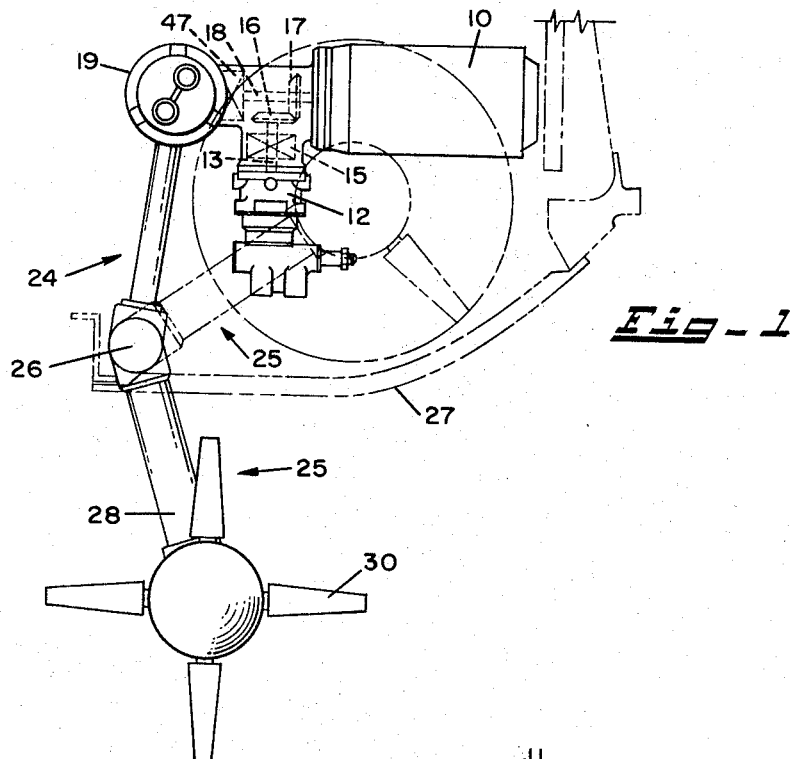

3,315,085
AUXILIARY HYDRAULIC AND ELECTRICAL POWER SUPPLY SYSTEM FOR AIRCRAFT
Joseph A. Mileti and Herbert H. Kouns, Camarillo, Calif., and Gabriel V. Pesce, Wiesbaden-Biebrich, Germany, assignors to Abex Corporation, a corporation of Delaware
Filed Mar. 12, 1965, Ser. No. 439,421
6 Claims. (Cl. 290—4)

This invention relates to an auxiliary system for supplying hydraulic and electrical power for an airplane. More particularly it relates to a power supply system which under normal operating conditions is powered by the aircraft engine but which is powered by an auxiliary ram-air turbine during emergency conditions such as when the aircraft engine is disabled or not operating.

In addition to the main function of providing forward thrust, the engine of an aircraft is usually also utilized as the prime mover for driving the electrical generator and for operating pumps to provide hydraulic pressure, both of which are, of course, necessary for the operation and flight of the aircraft. Unless some provision for auxiliary power is made, failure of the engine in such a system also causes a failure of the electrical and hydraulic systems as well, thereby causing a loss of control over the flight of the aircraft, electrical system blackout and other secondary critical failures.

It has been one of the objectives of this invention to provide an auxiliary electrical and hydraulic power supply system for an aircraft which is not dependent upon operation of the aircraft's engines. An additional objective has been to provide an auxiliary electrical and hydraulic system which is powered by a retractable ram-air turbine. It has been a further objective of the present invention to provide such an auxiliary system which utilizes components of the primary or engine driven system, especially the generator or alternator. A still further objective of the present invention has been the provision of an auxiliary electrical and hydraulic system for aircraft which can be operated completely independently of the primary hydraulic and electrical system of the aircraft.

The invention contemplates a combination of primary and auxiliary electrical and hydraulic systems. In broad terms, the primary system includes a generator or alternator which is driven by a fluid motor. Pressure fluid to operate the fluid motor is provided by a primary hydraulic pump which may be driven by the aircraft engine. The auxiliary system includes a selectively operable ram-air turbine which, without requiring power from the main system, can be extended from the aircraft while in flight into the air stream to be rotated thereby. When operating, the turbine provides mechanical driving power for the generator or alternator and for a secondary hydraulic pump which during the emergency conditions functions in place of the primary hydraulic pump. Alternatively, the turbine may drive the fluid motor as a pump to supply hydraulic power.

The ability of the primary and auxiliary system to function independently is achieved by the use of one-way clutch means so arranged that when the aircraft engine drives the generator neither the ram-air turbine nor the auxiliary hydraulic pump, if any, is driven; and when the turbine is operating it drives the generator and hydraulic pump through one-way clutch means without supplying power to the main engine or to the primary hydraulic pump.

The details of the invention will become more readily apparent from the description taken in conjunction with the drawings in which:

FIG. 1 is a front elevational view of a preferred electrical and hydraulic power supply system constructed in accordance with the present invention;

FIG. 2 is a diagrammatic side view of the system shown in FIG. 1; and

Figure 3:
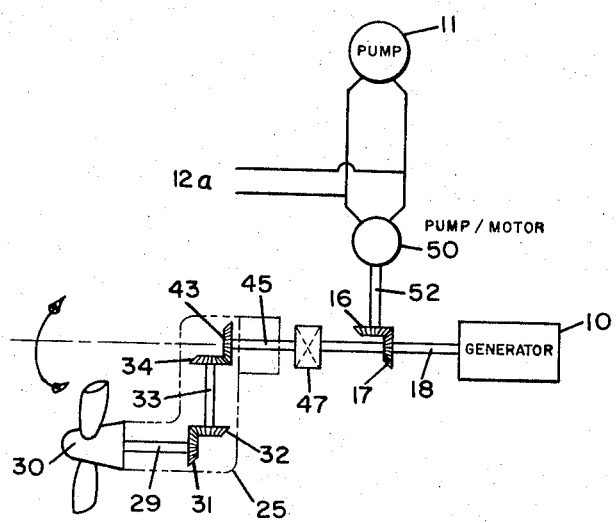
FIG. 3 is a diagrammatic side view of a modified or alternative hydraulic and electrical system also in accordance with the invention.

In the systems illustrated, a generator or alternator 10 of conventional design provides electrical power for the operation of the aircraft. As used hereinafter the term "generator" refers to either a generator or an alternator. Under normal operating conditions, the generator 10 is driven by a fluid motor 12 which in turn is operated by pressure from a primary hydraulic pump 11. This pump is usually driven by the main power plant or engine of the aircraft, not shown, which may be for example a conventional jet or internal combustion engine. The primary hydraulic pump 11 may be of conventional design and, in addition to driving the fluid motor 12, may also be used to provide fluid under pressure for operating conventional flight control devices designated diagrammatically at 12a which have not been shown.

The fluid motor 12 drives generator 10 through a driving shaft 13 which rotates a driven shaft 14. Shafts 13 and 14 are connected by a one-way clutch 15. This clutch 15 may be of a conventional design, and is operative to transfer power only in the direction from shaft 13 to shaft 14; that is, clutch 15 will not transfer power from shaft 14 to shaft 13. Such clutches are well known in the art, and are referred to hereinafter as one-way clutches.

Driven shaft 14 carries a bevel gear 16 which engages another bevel gear 17. Bevel gear 17 is carried by the operating shaft 18 of the generator 10. Together these elements comprise the main power supply system of the plane.

In the embodiment of the invention shown in FIGURES 1 and 2 the auxiliary system for use during emergency or other conditions of flight when the main pump 11 is not operating, is comprised generally of the generator 10 and an auxiliary hydraulic pump 19, both of which are connected in driven relation to a ram-air turbine, designated generally at 20. This turbine is ordinarily housed in the aircraft but can be extended at will, for example by battery power or by gravity and without engine power, to be driven by the air stream while the aircraft is moving.

The auxiliary hydraulic pump 19 may be of conventional design and has a capacity sufficient to provide fluid pressure to operate the control devices of the aircraft. Conventional one way valving 21 may link the primary pump 11 and the auxiliary pump 19 with the control devices at 12a so that hydraulic fluid under pressure from either pump 11 or pump 19 is supplied through hydraulic lines 22 and 23 to operate the devices 12a.

The ram-air turbine 20 is comprised generally of a fixed or upper portion 24 and a lower or movable portion 25. Lower portion 25 is pivotally secured to upper portion 24 at 26 so that as installed in an aircraft the movable portion 25 can be mechanically or electrically lowered or extended through the plane's fuselage 27, into the air stream.

The movable turbine portion 25 preferably comprises an L-shaped housing 28 which encloses a turbine shaft 29 which is in turn secured to a turbine 30. A bevel gear 31 on turbine shaft 29 engages another bevel gear 32 carried by one end of a shaft 33 which extends at right angles to shaft 29. At the other end of shaft 33 is a bevel gear 34. All of these shafts are suitably journalled by conventional means not shown.

The fixed turbine portion 24 includes a housing and bearing structure 35, and shafts 36 and 37. At one end shaft 36 carries a bevel gear 38 which engages bevel gear 34. Shaft 36 may be perpendicular to shaft 33. At the other end of shaft 36 is a bevel gear 39 which engages a bevel gear 40 which is carried by shaft 37, perpendicular to shaft 36.

Shaft 37 extends into gear box 35a and through a bevel gear 41 carried by it engages opposed bevel gears 42 and 43. Connected to bevel gears 42 and 43 respectively are drive shaafts 44 and 45. Drive shaft 45 is connected through a one-way clutch 47, which may be similar to clutch 15, to generator shaft 18. Clutch 47 transfers rotation and power from shaft 45 to shaft 18 but not in the reverse direction.

The means by which the shafts of the ram-air turbine gear box etc. are maintained and journalled in their respective positions are conventional and have not been shown in the drawings for the sake of simplicity.

In the normal operation of the electrical and hydraulic system just described, the aircraft engine powers the principal hydraulic pump 11 providing fluid pressure for driving fluid motor 12, and for operating the flight control devices 12a. Fluid motor 12 drives the generator shaft 18 through shafts 13, 14, clutch 15 and bevel gears 16 and 17. Rotation of shaft 18 is not transmitted to ram 30 to cause it to turn since clutch 47 transmits rotation only from shaft 45 to shaft 18, and not in the opposite direction.

In an emergency situation, such as when the aircraft engine fails and primary hydraulic and electrical power therefore ceases, the lower unit 25 of the fan is pivoted about point 26 into the air stream.

When the lower unit 25 is extended into the air stream, turbine fan 30 is rotated by the onrushing air. The rotation of turbine fan 30 rotates turbine fan shaft 29, in turn rotating shafts 33, 36 and 37 through bevel gears 31, 32, 34, 38, 39 and 40. Drive or output shafts 44 and 45 are thereby both caused to rotate because they are connected to shaft 37 through bevel gears 41, 42 and 43. Shaft 44 drives the auxiliary hydraulic pump 19 which provides fluid pressure for the control mechanisms 12a. Shaft 45 rotates shaft 18 through overrunning clutch 47 and provides power to operate generator 10.

During the operation of the ram-air turbine described above, shaft 14 is rotated by turbine fan 30. However, overrunning clutch 15 allows shaft 14 to "free wheel" without driving shaft 13, and fluid motor 12 and the aircraft engines are not driven.

FIG. 3 shows an alternative system in which the fluid motor that drives the generator or alternator during normal operating conditions is operated as a pump when the turbine is supplying power to the generator. This system thus requires no separate auxiliary pump but achieves substantially similar results by taking advantage of the dual functional capability of a single pump/motor. It will be noted that the system of FIG. 3 does not include the one way clutch 15, shafts 36 and 37, and gears 38–42 of the system first described.

In this alternative system, a pump/motor 50 operates as a motor when fluid under pressure is supplied to it as the input from pump 11, and as a pump when it is driven by a mechanical rotary input through shaft 52. During normal operating conditions, pump 11 drives pump/motor 50 as a motor. In turn, pump/motor 50 drives generator 10 through shafts 52 and 18, and gears 16 and 17. One way clutch 47 does not transmit rotation of shaft 18 to turbine 30.

During emergency conditions, as when pump 11 fails or is not being driven, lower unit 25 is extended into the air stream, causing turbine fan 30 to be rotated. Fan 30 thereby rotates shafts 29 and 33 through gears 31 and 32 which in turn rotate shaft 45 through gears 34 and 43. Shaft 45 drives generator 10 through clutch 47, and also rotates shaft 52 through gears 17 and 16. Pump/motor 50 is thereby driven as a pump, and supplies hydraulic fluid to the various mechanisms in the airplane. Pump 11 under these conditions is not operated.

Having thus described our invention, we claim:

1. An electrical and hydraulic power supply system for an aircraft having an engine comprising,
   a generator,
   primary means for driving said generator including a hydraulic pump driven by said engine and a rotary hydraulic fluid motor driven by said hydraulic pump, and
   selectively operable auxiliary means for driving said generator comprising a turbine fan selectively movable into the airstream of said aircraft, and gear, shaft and one-way clutch means connecting said fan to said generator, said clutch means transferring rotary motion from said turbine fan to said generator but not in the reverse direction.

2. An electrical and hydraulic power system for an aircraft having an engine comprising,
   a primary hydraulic pump driven by said engine,
   a fluid motor driven by said primary pump,
   a generator,
   a turbine fan,
   an auxiliary hydraulic pump,
   means including a first one way clutch connecting said fluid motor to said generator, said first clutch transferring power from said motor to said generator but not in the reverse direction, means operatively connecting said fan to said auxiliary hydraulic pump,
   and means including a second one way clutch connecting said fan to said generator, said second clutch transferring power from said fan to said generator but not in the reverse direction.

3. An electrical and hydraulic power system for an aircraft having an engine comprising,
   a primary hydraulic pump driven by said engine,
   a fluid motor driven by said primary pump,
   a generator having an operating shaft, means connecting said shaft to said motor including a one way clutch which transfers power from said motor to said shaft but not in the reverse direction,
   a ram-aim turbine, said turbine ordinarily being housed within said aircraft and being selectively movable into the air stream of said aircraft and rotated thereby,
   a gear box, said gear box including at least two output shafts,
   a ram-air turbine, said turbine ordinarily being housed so that said output shafts are rotated when said turbine fan is rotated,
   an auxiliary hydraulic pump driven by one of said output shafts,
   and means connecting said other output shaft to said operating shaft through a second one way clutch which transfers power from said other output shaft to said operating shaft but not in the reverse direction.

4. An electrical and hydraulic system for an aircraft having an engine comprising,
   a primary hydraulic pump driven by said engine,
   a pump/motor operated as a motor by said primary pump when said primary pump is operating,
   a generator,
   means operatively connecting said pump/motor to said generator,
   a turbine fan ordinarily housed within said aircraft but selectively movable into the airstream of said aircraft to be rotated thereby,
   and means including a one way clutch connecting said fan to said generator and to said pump/motor, said clutch transferring power from said fan to said generator and pump/motor but not in the reverse direction, said fan thereby operating said pump/motor as a pump when said fan is rotated by said airstream.

5. An electrical and hydraulic system for an aircraft comprising, means for generating electric power when driven by a rotary input, primary drive means for operating said electric power generating means, means including a one way clutch connecting said primary drive means to said electric power generating means, said clutch transferring rotation from said primary drive means to said electric power generating means but not in the reverse direction, a turbine fan selectively lowerable into the aircraft's air stream to be driven thereby, means including a second one way clutch connecting said fan to said electric power generating means, said second clutch transferring rotation from said fan to said electric power generating means but not in the reverse direction, a hydraulic pump, and means operatively connecting said fan to drive said pump whenever said fan is rotated.

6. A power supply system for an aircraft comprising, electric power generating means having an operating shaft and producing electric power when a rotary input is supplied to its operating shaft, primary means for driving said electric power generating means including a primary hydraulic pump and a pump/motor driven as a motor by said primary hydraulic pump when said pump is operating, means operatively connecting said pump/motor to the operating shaft of said electric power generating means, auxiliary means for driving said pump/motor as a pump and for driving said operating shaft comprising a turbine selectively movable into the airstream of said aircraft to be rotated thereby, and one way drive means mechanically interconnecting said turbine and said pump/motor and said operating shaft and transferring rotation of said turbine to said pump/motor to operate the same as a pump and to said operating shaft but not in the reverse direction.

References Cited by the Examiner
UNITED STATES PATENTS

| | | | |
|---|---|---|---|
| 2,706,255 | 4/1955 | Beaux | 290—55 XR |
| 2,939,017 | 5/1960 | Teague et al. | 290—55 XR |

ORIS L. RADER, *Primary Examiner.*

G. SIMMONS, *Assistant Examiner.*

UNITED STATES PATENT OFFICE
CERTIFICATE OF CORRECTION

Patent No. 3,315,085                                    April 18, 1967

Joseph A. Mileti et al.

It is hereby certified that error appears in the above numbered patent requiring correction and that the said Letters Patent should read as corrected below.

Column 4, line 40, for "ram-aim" read -- ram-air --; line 46, strike out "a ram-air turbine, said turbine ordinarily being housed" and insert instead -- said ram-air turbine being connected to said gear box --.

Signed and sealed this 14th day of November 1967.

(SEAL)
Attest:

Edward M. Fletcher, Jr.                              EDWARD J. BRENNER
Attesting Officer                                         Commissioner of Patents